(12) United States Patent
Cefai (10) Patent No.: US 10,502,331 B2
(45) Date of Patent: Dec. 10, 2019

(54) ONE WAY VALVE

(71) Applicant: ViCentra B.V., Utrecht (NL)

(72) Inventor: Joseph John Cefai, West Glamorgan (GB)

(73) Assignee: VICENTRA B.V., Utrecht (NL)

( * ) Notice: Subject to any disclaimer, the term of this patent is extended or adjusted under 35 U.S.C. 154(b) by 34 days.

(21) Appl. No.: 15/628,380

(22) Filed: Jun. 20, 2017

(65) Prior Publication Data

US 2017/0299075 A1 Oct. 19, 2017

Related U.S. Application Data (63) Continuation of application No. 14/436,607, filed as application No. PCT/NL2013/050839 on Nov. 21, 2013, now Pat. No. 9,714,716.

(30) Foreign Application Priority Data

Nov. 22, 2012 (GB) ..................................... 1220974

(51) Int. Cl.
*F16K 15/14* (2006.01)
*F16K 99/00* (2006.01)

(52) U.S. Cl.
CPC ............ *F16K 15/14* (2013.01); *F16K 15/144* (2013.01); *F16K 99/0015* (2013.01); *F16K 99/0057* (2013.01)

(58) Field of Classification Search
CPC .... F16K 15/14; F16K 15/144; F16K 99/0015; F16K 9/0057
See application file for complete search history.

(56) References Cited

U.S. PATENT DOCUMENTS

| 2,990,849 | A | | 7/1961 | Peras |
| 3,176,712 | A | | 4/1965 | Ramsden |
| 3,342,208 | A | | 9/1967 | Steffes |
| 4,080,981 | A | | 3/1978 | Stewart |
| 4,324,097 | A | * | 4/1982 | Schmitt ..................... F01N 3/34 60/293 |

(Continued)

FOREIGN PATENT DOCUMENTS

| CN | 1425477 A | 6/2003 |
| CN | 101601886 A | 12/2009 |

(Continued)

OTHER PUBLICATIONS

International Search Report and Written Opinion of the International Searching Authority for PCT/NL2013/050839, dated Feb. 12, 2014 (7 pgs).

(Continued)

*Primary Examiner* — P. Macade Nichols
(74) *Attorney, Agent, or Firm* — Hahn Loeser & Parks, LLP (57) ABSTRACT

An one way valve comprising: a conical shaped valve seat (1); and a membrane (2) having a hole (3) that is located around the conical valve seat (1), such that a surface (60) of the valve seat (1) seals onto an inner periphery (61) of the hole in the membrane (2), wherein, in use, the membrane (2) is deflected from the surface (60) of the valve seat (1) to provide a fluid path across the membrane (2) and allowing fluid to flow from one side of the membrane (2) to the other.

26 Claims, 7 Drawing Sheets

(56) References Cited

U.S. PATENT DOCUMENTS

| | | | |
|---|---|---|---|
| 5,388,615 A | 2/1995 | Edlund et al. | |
| 5,971,024 A | 10/1999 | Penny | |
| 6,745,763 B2 | 6/2004 | Webb | |
| 2003/0020040 A1 | 1/2003 | Anderson | |
| 2005/0175490 A1 | 8/2005 | Seto et al. | |
| 2007/0026269 A1 | 2/2007 | Nakakubo | |

FOREIGN PATENT DOCUMENTS

| | | |
|---|---|---|
| CN | 1022723914 A | 12/2011 |
| DE | 424855 | 8/1926 |
| EP | 388 828 | 9/1990 |
| GB | 2013311 A | 8/1979 |
| WO | WO 2008/114218 A2 | 9/2008 |

OTHER PUBLICATIONS

May 30, 2016 Office Communication in connection with CN 201380059940.1.
Jun. 30, 2016 Office Action in connection with U.S. Appl. No. 14/436,607.
Feb. 2, 2017 Office Action in connection with U.S. Appl. No. 14/436,607.
Feb. 3, 2017 Office Communication in connection with CN 201380059940.1.
May 19, 2017 Office Communication in connection with EP 13799401.8.

* cited by examiner fig. 1.

ONE WAY VALVE

The present application is a continuation of U.S. Ser. No. 14/436,607, which is a U.S. national stage of international application no. PCT/NL2013/050839, filed 21 Nov. 2013 and published in the English language with publication no. WO 2014/081292 A1 on 30 May 2014, which claims the benefit of the filing date of GB 1220974.8, filed 22 Nov. 2012.

FIELD OF THE INVENTION

The design of micro-pumps for the delivery of pharmaco active agents demands high levels of performance. Insulin pumps are required to deliver medication at dose rate increments of between 0.25 and 0.5 Units of insulin per hour. When used to deliver standard U100 insulin this translates to fluid flow rate increments of 25 and 50 $\eta l$ of medication per hour. The current standard for flow delivery defines a flow rate accuracy of better than +/−5% of the flow rate the pump is programmed to deliver. This translates to a flow rate accuracy of +/−0.75 and 2.50 $\eta l$ of medication per hour. Micro-pumps designed for these purposes therefore need to avoid design features that can generate medication delivery errors of this magnitude.

BACKGROUND OF THE INVENTION

Micro pumps have been proposed for delivering medication particularly in applications where the dosing accuracy is very high and there is a requirement for portability of the medication system. While a number of micro pump designs have been described, pulsatile micro pumps have found applications in medication delivery.

A micro-pump design based on a pulsatile pumping system typically comprises a pumping chamber, into which a piston is pushed by a mechanical force, a valve on the inlet that controls flow such that it can only flow into the pumping chamber and a valve on the outlet that controls flow such that fluid can only exit the pumping chamber. When the piston is forced into the pumping chamber, and assuming the pumping chamber is full of fluid, the piston displaces a volume of fluid from the pumping chamber that is equivalent to the volume of the piston entering the pumping chamber. The displaced volume can only exit the micro-pump via the outlet because of the flow control exerted by the valves at the inlet and outlet.

When the piston retracts from the pumping chamber, a volume of liquid enters the pumping chamber that is equivalent to the volume of the piston that has retracted from the pumping chamber. Liquid can only enter the pumping chamber via the outlet because of the fluid control exerted by the valves on the outlet and the inlet.

Passive, normally closed one way membrane micro valve designs are commonly employed in micro pump design because they present a number of advantages. The construction of these micro valves typically comprises a membrane that serves to separate the fluid at the inlet to the pumping chamber from that present in the pumping chamber in the case of the inlet micro valve, or serves to separate the fluid present in the pumping chamber from that at the outlet of the pumping chamber in the case of the micro valve on the outlet. This membrane seals across a conduit that carries fluid across the micro valve structure. In normally closed micro valves, this membrane seals across the conduit and prevents the flow of fluid across the valve. The valve membrane seals onto a valve seat structure incorporated into the conduit and designed to accommodate at least part of the membrane and create a good fluidic seal. When the pressure on the side of the membrane from which liquid is allowed to enter and pass through the micro valve, exceeds the pressure on the opposite side of the membrane, the membrane releases its seal on the valve seat and fluid leaks from one side of the membrane to the opposite side. Liquid is prevented from flowing in the opposite direction since it is desirable that the valve membrane seals effectively against the valve seat, and this sealing is further improved by the increase in pressure on the side of the micro valve from which liquid is prevented from flowing.

The design features of micro pumps that contribute to inaccurate fluid delivery are known. For both liquid filling of the pumping chamber and fluid displacement out of the pumping chamber, it is advantageous if the pumping chamber is designed in such a way that the pumping piston displaces all the volume enclosed by the pumping chamber. This also includes any volume of liquid connecting the pumping chamber to the outlet of the micro valve and the volume of fluid connecting the pumping chamber to the outlet micro valve. In the case of a micro-pump designed for insulin delivery and which meets the current performance standard, it is not desirable that when the piston enters the pumping chamber the displacement of liquid varies by more than +1-2.5 $\eta l$.

Also important, is that the pumping chamber volume fills completely with liquid and is devoid of air bubbles. The design of the pumping chamber therefore has to avoid features that could either trap air during initial filing of the pump with liquid or retains air bubbles if they accidentally enter the pumping chamber via the inlet. Air in the pumping chamber has the effect of reducing the volume of liquid displaced during the stroke volume. In the case of a micro-pump designed for insulin delivery and which meets the current performance standard, it is not desirable that the displacement of liquid when the piston enters the pumping chamber does not vary by more than +/−2.5 $\eta l$. It is therefore desirable that the design of the micro valves at both the inlet and outlet of the pumping chamber integrates with the design of the pumping chamber, and that the resulting design avoids significant volumes that will not by expelled during the dispense stroke of the pump, and also avoids features that may encourage the retention of air bubbles within the pumping chamber volume.

The efficient delivery of the stroke volume can also be reduced if the pumping chamber is not completely contained within a rigid structure. In this respect, the presence of the valve membrane in both the inlet and outlet valves could result in at least part of the pumping chamber being flexible, absorbing some of the displaced volume created by the pumping piston and reducing the volume of fluid displaced. It is therefore important to ensure that while the valve membrane can flex to release the seal on the valve seat and allow liquid flow, it cannot flex at any other part of the valve. In the case of a micro-pump designed for insulin delivery and which meets the current performance standard, it is not desirable that the displacement of liquid when the piston enters the pumping chamber does not vary by more than +/−2.5 $\eta l$. In relation to the design of micro valves, this requires that the micro valve volume that is connected to the pumping chamber does not expand by more than 2. or contract by more than 2.5 $\eta l$.

Another important feature of the micro valve on the inlet of a micro pump is that the micro valve is required to allow flow of liquid as soon as the pressure at the micro valve inlet increases above the pressure at the outlet side of the inlet vale, and that this flow of liquid is unrestricted. This ensures that when the piston retracts from the pumping chamber, liquid enters the chamber from the inlet micro valve more efficiently, and the design of the micro pump can avoid having to employ methods and devices that increase the effective pressure of any reservoir providing liquid to the micro pump. Also it ensures that the pump can cycle quickly between fill strokes, when the piston retracts from the pumping chamber, and dispense strokes, when the piston enters the pumping chamber. To operate without the aid of a pressurised reservoir to supply the liquid to the micro pump, the micro valve on the inlet to the micro pump is required to allow flow at a pressure difference of less than 1 Atm. It is also required to allow at least 33 ηl/sec flow rate if the micro pump is to support the medication dispense rates that are typical of insulin delivery therapies using U100 insulin.

An important feature of the micro valve on the outlet of the micro pump is that this micro valve prevents flow from the inlet to the outlet of the micro valve except when the pumping piston enters the pumping membrane during the dispense stroke, and so prevents leakage of fluid through the pump when the pump is at rest. This could require that the micro valve at the outlet prevents flow at pressure levels that may exist inside the reservoir supplying the micro pump with liquid. These pressure levels may have been set to ensure efficient filling of the pumping chamber during the fill stroke. A micro pump delivering insulin at normal atmospheric conditions would require an outlet valve capable of preventing liquid flow up to a pressure difference across the valve membrane of 2 atms. If the reservoir supplying the insulin is pressurised to aid filling of the pumping chamber, the valve on the outlet of the pump may need to prevent flow at higher pressures.

Additionally, there is a need for medication delivery products that can be manufactured at low cost and in large numbers. These medication delivery systems are not intended to be used continuously but to be replaced on a periodic basis, and once the delivery system has operated for the intended duration. Medication delivery products designed for the delivery of insulin may require that a single device may be used for up to a period of three days before the components in contact with the insulin are discarded and replaced with new ones. This requires that the product can be manufactured and assembled using methods and processes that are cost effective. In addition, the device has to be manufactured from materials approved for use with the medication and can be sterilised prior to use using cost effective sterilisation processes. It is also required that the manufacturing and assembly processes produce devices that have equivalent performance characteristics. The combination of these requirements places imposes significant restrictions on the design of medication delivery devices.

A micro pump designed for use with certain medications may be required to operate efficiently even when particulate material is present in the medium. The insulin protein in commonly used diabetes medications is known to aggregate to form particles and fibres. These particles or fibres can be large enough to become trapped in certain features of a medication delivery system. Examples of these features are liquid sealing areas such as those found in membrane valves. This can cause the sealing of the valve to become less efficient and affect the performance of the medication delivery system.

A large variety of micro-valves have been described that could be used as part of the design for a micro pump. They include both passive and active devices. Passive micro valves are generally preferred over active valves due to their simple construction and design. Passive micro-valves are predominantly designed to provide fluid flow selectively in one direction, requiring a build-up of pressure by the fluid on one side of the valve, and in the direction the micro-valve is designed to allow flow.

In general the requirements for a one-way, passive micro-valve are that the valve allows flow of the fluid in the intended direction of flow, while preventing the flow of fluid in the reverse direction. For this purpose, sealing between the parts incorporated into the design to prevent reverse flow of fluid is of primary importance. Conversely, these parts are required to break the seal formed between them to allow fluid to flow in the intended direction. In some cases, it is desirable if the breaking of this seal only occurs above a certain build up of fluid pressure in the direction of intended flow.

A variety of passive micro-valve designs have been proposed. A large number rely on silicon micro-fabrication techniques and are constructed from silicon or one of its derivative materials (silicon nitride, silicon oxide etc.). The use of silicon materials in the construction of micro-valves presents a singular problem. The stiffness of the materials and the hardness of the materials, combine to making sealing of micro-valves constructed in this way a challenge. These two physical characteristics of the candidate materials prevent the sealing surfaces to conform to the surface irregularities of the other and provide efficient fluidic sealing. In fact, it is almost certainly the case that if the sealing surfaces could not be produced to such high flatness and accuracy using microfabrication technologies, these micro-valves would not be able to seal sufficiently to create an efficient micro-valve. However, even when these valves operate sufficiently well, the use of these micro-valves to valve fluids with particulate material suspended in them, or in applications that support the build up of surface fouling layers, tends to accentuate the problem of creating effective seals between hard and stiff materials.

The use of elastomeric materials in the construction of fluid controlling valves has been known for some time. Specifically, the use of elastomeric materials in the construction of micro-valves has also been described. The use of elastomeric materials for these purposes provides an advantage since they can continue to provide the effective sealing for which they are responsible even in the presence of particles in the liquid.

A review of the current state of the art finds that a variety of micro valve designs have been proposed that incorporate an elastomeric membrane. Each design incorporates a valve membrane and a valve seat. The designs are different in the arrangement of the membrane relative to the valve seat design.

The prior art describes valves where the valve membrane seals onto a valve seat that is essentially planar to the valve membrane and essentially parallel to that membrane. These designs have been embodied as essentially planar membranes sealing onto planar valve seats, essentially planar membranes sealing onto a raised valve seat and a further modification of this embodiment to include raise ridges on the valve seat to enhance the sealing between the membrane and the valve seat. In some embodiments the valve seat is reduced to form only a raised annular ring onto which the membrane seals. In other embodiments, valves have been described where the membrane is further modified to include raised annular ridges that enhance the sealing of the membrane onto the valve seat. U.S. Pat. No. 3,827,456A describes a valve design that incorporates many of the features described above. U.S. Pat. No. 3,827,456A describes a valve where the elastomeric valve membrane has a central hole at the centre of a annular raised bead that seats on top of an annular valve seat so that it seals on the surface at the top of the valve seat. The elastomeric membrane is stretched over the seat to provide an efficient sealing force. The inlets to the vale are arranged circumferentially around the annular valve seat. The valve membrane also has a thickening of the external annular portion to facilitate its positioning into the valve structure.

Valve designs are further characterised by having one of at least two embodiments. The first incorporates a valve membrane that is held in close proximity to the valve seat and relies on at least some influence from the fluid in the valve to affect its sealing onto the valve seat. These valves seal only when the pressure difference between one side to the sealing membrane and the other is high enough and in the correct direction to seal the membrane against the valve seat. The second incorporates a valve membrane that is held against the valve seat either by the tension in the valve membrane or by a structure used to force the membrane against the valve seat. An example of the first is a membrane stretched over a pillar shaped valve seat. An embodiment of the latter is a membrane held in place by a spring, acting on the membrane to force it against the valve seat.

U.S. Pat. No. 4,493,339A describes a valve having a valve membrane with a raised annular section that when seated onto a flat valve seat creates the sealing force for the valve. The valve membrane also has a thickened outer annular segment that is used to locate the membrane into the valve construction and help retain the valve under correct tension against the valve seat. To aid this, prior to assembly into the valve a cross sectional view of the valve membrane shows that the raised annular section that forms the seal for the valve is lower than the edge of the thickened outer annular segment.

U.S. Pat. No. 3,176,712A describes a valve incorporating a valve membrane stretched over a semi-spherical valve seat. The valve seat is located over a base plate perforated to allow fluid to past through it. Fluid can then leak past the seal between the valve seat and the valve membrane if there is sufficient pressure to do so. The membrane has a centrally located hole that is normally blocked by the semi spherical valve seat, but through which fluid flows when the seal is broken.

GB 2443260 describes a micro valve comprising a valve membrane stretched over a valve seat located onto the projecting surface of a pillar. Liquid enters the valve through a hole centrally located in the valve seat pillar and, when the pressure on the inlet to the valve is high enough, passes past the seal created between the membrane and the valve seat. The membrane has at least one hole to allow fluid to pass through the membrane once it has broken past the seal between the membrane and the valve seat.

A number of valve designs describe valve membranes that are structured to provide the membrane with regions of different structural strength, and to allow the valve to operate.

U.S. Pat. No. 4,143,853A describes a valve based on a valve membrane that has a slit cut into the central portion such that the slit opens to allow flow but seals when flow is reversed through the valve. The valve membrane has a thickening around the central flexible portion to provide the membrane with a ring of structural material that assists in keeping the membrane in tension and the slit in a normally closed position. U.S. Pat. No. 4,770,740A describes a micro valve and a method for manufacturing it that comprises a flexible nickel valve membrane that has an inner portion that seals against the valve seat and creates the sealing for the valve. The valve membrane is fabricated from a single sheet of nickel that is structured to provide the flexible valve sealing portion and a rigid frame that retains this flexible portion in position and under tension. The two are connected by a series of supporting arms.

Valve designs that incorporate a flexible membrane forcibly held against a valve seat are preferred in the design of micro pumps where very low displacement volumes are common. They are also preferred for other very low flow rate applications. These valve designs have the greatest potential to prevent reverse flow of liquid even at very low back pressures. The micro-valve design creates a structure where only a very small section of the device is important to the sealing performance of the micro-valve. Moving the sealing surface away from the inlet hole creates new opportunities for micro-valve designs.

Micro-valve designs such as described in GB2443260B require that the pillar that comprises the valve seat is large enough to allow a through hole to be formed in the centre of the pillar to provide the inlet to the micro-valve. Current fabrication technologies restrict the minimum radius that can be achieved for this through hole, and also restrict the wall thickness between the hole and the outer diameter of the pillar. Furthermore, the total cross-section area of the inlet hole available for fluid flow is restricted by these limitations.

CA1301244C describes a valve device that also seals at a junction between the sealing membrane and the surface of the valve seat. In one embodiment CA1301244C describes the use of a conical valve seat as a further improvement to the device. However, CA1301244C describes a relatively large valve that cannot be readily replicated using micro fabrication techniques and for the construction of a micro-valve. Also, the limitations described in relation to GB2443260B apply to this design. Specifically, the location of the inlet for the valve at the centre of the valve seat and the limitations imposed by fabrication techniques relative to this feature.

SUMMARY OF THE INVENTION

A one way micro valve comprising a valve seat where the valve seat protrudes through a hole in a membrane. The hole in the micro valve membrane provides the fluidic conduit from the inlet side of the micro valve to the outlet side of the micro valve. The valve seat protrudes sufficiently through the hole and the hole is sufficiently small so that the micro valve seat seals onto the edge of the hole in the micro valve membrane. Alternatively, the sealing is between the surface of the micro-valve seat and the surface of the membrane contacting the peripheral face of the valve seat. The sealing is sufficient to prevent flow of fluid from the outlet side of the micro valve to the inlet side of the micro valve, but when the pressure difference between the inlet side of the micro valve and the outlet side of the micro valve is sufficiently positive, the membrane is deflected away from the micro valve seat and fluid is allowed to flow between the valve seat and the hole in the membrane.

In a preferred embodiment of the micro valve, the micro valve seat that provides fluidic sealing onto the membrane is essentially conical in shape. The conical shape of the micro valve seat allows the micro valve seat to seal effectively onto the edge of the membrane. The conical shape of the micro valve seat also allows the seat to be located into the hole in the flexible membrane. This aids alignment between the hole in the membrane and the valve seat. During assembly of the micro-valve, the conical valve seat is located into the hole in the membrane, and then pushed further through the hole thereby stretching the diameter of the hole. This serves to improve the sealing of the flexible micro valve membrane onto the valve seat. The angle of the conical surface relative to the micro valve membrane, and the amount by which the valve seat penetrates through the hole in the membrane can be adjusted to either increase or decrease the level of fluidic sealing produced at the interface between the surface of the conical valve seat and the outer periphery of the hole in the valve membrane.

The level of fluidic sealing can also be adjusted by adjusting the geometrical dimensions of the hole in the membrane relative to the geometrical dimensions of the valve seat, in particular the diameter of the valve seat in the region where it contacts the hole in the membrane, once the valve seat is fully located into the hole in the membrane.

A micro valve comprising of at least three parts. A first body portion comprising the micro valve seat, a second body portion structured to align with the first body portion and a micro valve membrane held between the first and second body portions, and that aligns with the first and second body portions. A first body portion that has a fluidic inlet that is in fluidic contact with the hole in the micro valve membrane when the valve is open. A second body portion that has a fluidic outlet that is fluidic connection with the hole in the membrane. The second body portion having a chamber formed to allow the membrane to move when the micro valve opens, and which is located over the valve seat on the first body portion. A membrane having a hole located over the valve seat in the first body portion such that the valve seat at least partially protrudes through the hole and at least seals the hole. The three parts can be held together by adhesive bonding, with the use of a clamp, held together in a housing, joined by thermal bonding or by any other method that will be apparent to one practiced in the art. The three parts can be aligned either by the use of alignment posts or by aligning the peripheral edge of the parts.

A micro valve where the surface of the valve membrane contacting the surface of the first body portion incorporating the micro valve seat is mechanically supported by the surface of the first body portion to prevent the membrane from flexing when the pressure on the outlet side of the micro valve increases, relative to the pressure at the inlet side of the membrane.

A micro valve where the fluid inlet of the first body portion is spatially separated from the valve seat structure. The fluidic inlet to the valve can be provided by fluidic conduits through the first body. The cross section dimension of the opening of these conduits can be reduced to reduce or avoid sections of the membrane that are not supported by the first body part. The fluidic conduits comprising the inlet can also be located in areas of the first body part that do not contribute to the mechanical support offered by the first body part to the membrane. The flow rate can be maximised through the micro valve by incorporating a number of conduits that collectively form the inlet. Alternatively the fluidic inlet can be a conduit that is formed between the surface of the first body portion and the membrane. The fluidic conduit can be designed to maximise flow rate while retaining the mechanical support provided by the first body part to the membrane.

A micro valve where the diameter of the hole in the membrane can be adapted to offer the best flow rate characteristics for the micro valve while still provide efficient sealing when the pressure at the outlet of the micro valve exceeds the pressure at the inlet.

One advantage of this invention is that flow rate through the micro valve can be optimised without increasing the opportunity for the membrane to flex when the pressure at the outlet to the micro valve increases relative to the pressure at the inlet.

Another advantage of this invention is that the first body portion offers structural support to the flexible membrane and therefore minimises the flexing of the membrane when the pressure at the outlet of the micro valve is greater than the pressure at the inlet. This allows the micro valve to be used in micro pump designs that require rigid boundaries within the region of the pumping chamber.

Another advantage of this invention is that the simple construction of the micro valve and the opportunity to selectively define the nature of the fluidic inlet and outlet provide a micro valve that can be integrated into micro pump designs.

Another advantage of this design is that the design can be adapted to create micro valves with different performance characteristics. This includes valves that all seal efficiently when the pressure at the outlet exceeds the pressure at the inlet, but that vary with regard to the excess pressure required at the inlet relative to the outlet to deflect the membrane from the valve seat and allow fluid flow.

Another advantage of the present invention is that the construction of the micro valve is simple and avoids fabrication processes that would otherwise make the manufacture of this micro valve difficult or expensive when produced in large numbers and for low cost applications. The features critical to the efficient functioning of the micro valve can be fabricated using industry standard processes for the fabrication of low cost parts in high volumes. By way of example, the sealing surface of the cone shaped micro valve seat is the sloping surface of the valve seat. This feature can be defined with accuracy and repeatability when employing industry standard injection moulding techniques.

The invention furthermore relates to an one way valve comprising: a conical shaped valve seat; and a membrane having a hole that is located around the conical valve seat, such that a surface of the valve seat seals onto an inner periphery of the hole in the membrane, wherein, in use, the membrane is deflected from the surface of the valve seat to provide a fluid path across the membrane and allowing fluid to flow from one side of the membrane to the other.

In an embodiment of the one way valve according to the invention, the surface of the valve seat seals onto an edge of the inner periphery of the hole in the membrane.

In an embodiment of the one way valve according to the invention, the membrane is a flexible member which applies a force on the valve seat when the surface of the valve seat seals onto the inner periphery of the hole in the membrane.

In an embodiment of the one way valve according to the invention, the one way valve comprises an inlet side and an outlet side and the membrane is configured to deflect from the surface of the valve seat at a specific pressure difference between the inlet side and the outlet side.

In an embodiment of the one way valve according to the invention, the membrane is selectively supported around an outer peripheral portion of the membrane such that deflection is restricted to an inner portion of the membrane.

In an embodiment of the one way valve according to the invention, the hole in the membrane is formed in the inner portion of the membrane.

In an embodiment of the one way valve according to the invention, the one way valve further comprises a first body portion that includes the valve seat.

In an embodiment of the one way valve according to the invention, the one way valve further comprises a mechanical stop to restrict the deflection of the membrane towards the valve seat and the first body portion.

In an embodiment of the one way valve according to the invention, the mechanical stop restricts deflection of the member towards the valve seat and the first body portion when the surface of the valve seat seals onto the inner periphery of the hole in the membrane.

In an embodiment of the one way valve according to the invention, the mechanical stop forms part of the valve seat.

In an embodiment of the one way valve according to the invention, the mechanical stop forms part of the first body portion.

In an embodiment of the one way valve according to the invention, the first body portion has a fluid conduit formed to provide an inlet of the one way valve.

In an embodiment of the one way valve according to the invention, an aperture is formed at a base of the valve seat, which aperture forms part of the fluid path across the membrane.

In an embodiment of the one way valve according to the invention, multiple apertures are formed at a base of the valve seat, which apertures form part of the fluid path across the membrane.

In an embodiment of the one way valve according to the invention, the at least one aperture is formed as part of the mechanical stop.

In an embodiment of the one way valve according to the invention, the one way valve further comprises a second body portion on an opposite side of the membrane to the first body portion.

In an embodiment of the one way valve according to the invention, the second body portion comprises a fluid conduit formed there through defining an outlet of the one way valve.

In an embodiment of the one way valve according to the invention, a cavity is defined by a recess in the second body portion into which the membrane moves when the valve opens.

In an embodiment of the one way valve according to the invention, the cavity creates a fluid path from the hole in the membrane to the outlet of the valve.

In an embodiment of the one way valve according to the invention, the membrane is of a material selected from a group of materials including: rubber, silicone, and an elastomer.

The invention furthermore relates to a pump incorporating the valve according to the invention.

The invention further relates to a medication delivery device incorporating a pump according to the invention.

BRIEF DESCRIPTION OF THE DRAWINGS

Embodiments of the one way valve will be described by way of example only.

DETAILED DESCRIPTION OF THE DRAWINGS

Figure 1:
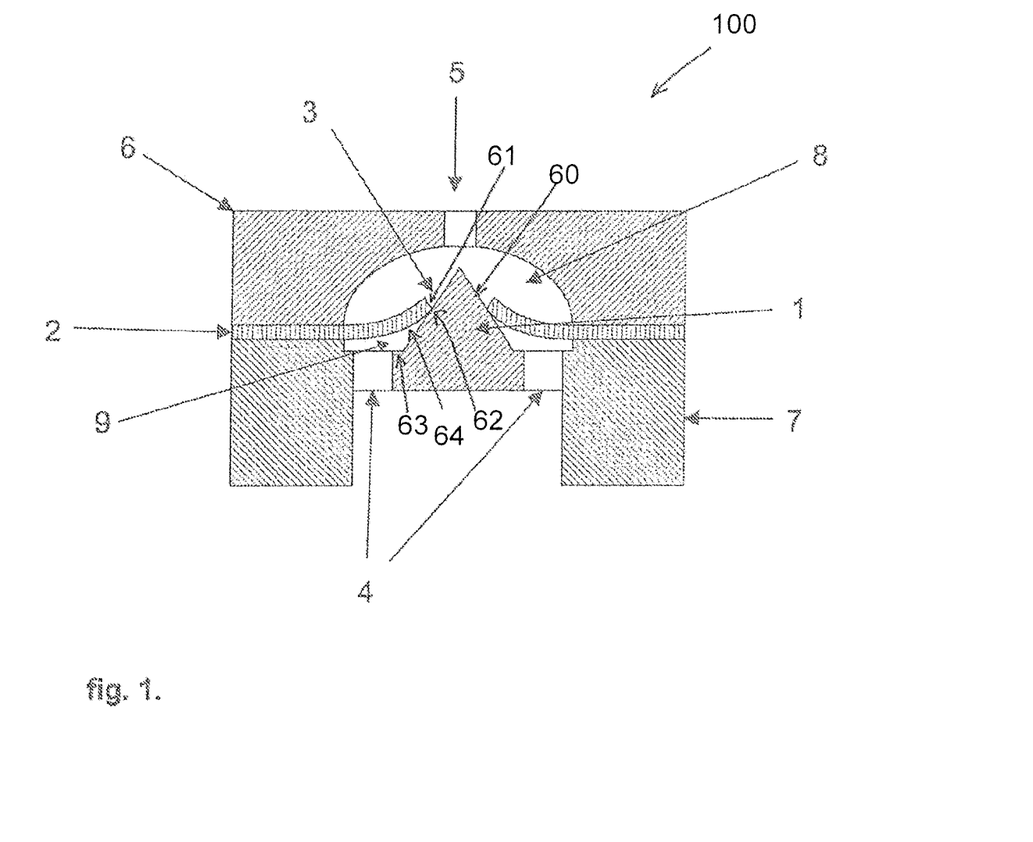
FIG. 1. shows a cross section through a micro valve as described in the present invention FIG. 2. shows one arrangement of holes forming the inlet conduit structure for one embodiment of the micro valve as described in the present invention FIG. 3. shows an alternative arrangement of holes forming an alternative inlet conduit structure for one embodiment of the micro valve as described in the present invention FIG. 4. shows a cross section through an alternative embodiment of the micro valve as described in the present invention, showing micro valve seat with a flattened top FIG. 5. shows a cross section through an alternative embodiment of the micro valve as described in the present invention, showing the valve seat formed as an insert that locates into the bottom housing of the micro valve FIG. 6. shows a cross section through an alternative embodiment of the micro valve as described in the present invention, showing an alternative arrangement of inlet holes that form the inlet conduit for the micro valve.

FIG. 1. Shows a drawing of a cross section of the micro valve described in the present invention. The one way micro valve 100 comprises bottom housing 7 (also referred to as first body portion), and a top housing 6 (also referred to as second body portion), and a membrane 2 held between them. The parts can be held together using one or more of a number of methods, including adhesive bonding, thermal bonding, or by the use of external mechanical fixations or clamps. Those practiced in the art will appreciate the variety of methods available for this purpose.

The bottom housing comprises a conical shaped valve seat 1. The conical shaped valve seat 1 has a surface 60. Disposed around the valve seat 1 are channels 4 (also referred to as apertures) capable of carrying fluid into or out of the micro valve, and the chamber 9 formed between the membrane 2 and the bottom housing 7. The channels 4 are located at the inlet side of the micro valve 100.

A chamber 8 is formed in the top housing 6 large enough to accommodate the membrane and the valve seat 1. A conduit 5 is formed in housing 6 to carry fluid to or from the chamber 8. The conduit 5 is located at the outlet side of the micro valve 100. The volume of chamber 9 is made as small as possible to avoid movement of the membrane 2 towards the bottom housing 7 when the pressure in chamber 8 is greater than the pressure in chamber 9. The surface of bottom housing 7 provides a mechanical stop 63 for the membrane 2 to prevent or limit deflection of membrane 2 when the pressure in chamber 8 is greater than the pressure in chamber 9.

It is an advantage of this design that the volume of chamber 9 can be reduced by adapting the shape of the conical valve seat 1.

The membrane 2 is formed from elastomeric material. A hole 3 is formed in the membrane 2. The hole 3 comprises an inner periphery 61. The valve seat 1, is located in the hole 3 and protrudes through the hole 3 such that the membrane 2 is deflected by the valve seat 1, and valve seat 1 forms a seal on the hole 3 of the membrane. The surface 60 of the valve seat 1 seals onto an edge 62 of the inner periphery 61 of the hole 3 in the membrane 2. Sealing can also be to a lesser or greater extent between a surface 64 of the membrane 2 that contacts the surface 10 of the valve seat 1. The sealing is sufficient to prevent flow of fluid from chamber 8 to chamber 9 when the pressure in chamber 8 is higher than the pressure in chamber 9.

The seal formed between the hole 3 in membrane 2 and the surface 60 of valve seat 1, or between the surface 60 of valve seat 1 and at least part of the surface of membrane 2, provides a seal against flow of fluid from chamber 9 to chamber 8 unless the pressure in chamber 9 is higher than the pressure in chamber 8, and the difference exceeds the break through pressure of the valve 100 by providing sufficient force to partially and temporarily lift the membrane 2 away from the surface 60 of the valve seat 1. The force required to lift the membrane 2 away from the surface 60 of valve seat 1 is the extent to which the membrane 2 is deflected by the valve seat 1, the stiffness of the membrane 2 and the surface finish on the valve seat 1. The features that define the deflection of membrane 2, the stiffness of membrane 2 and the surface finish on valve seat 1 are known to those practiced in the art. It is possible by combining these features that micro valves can be fabricated with different breakthrough pressures.

Figure 2:
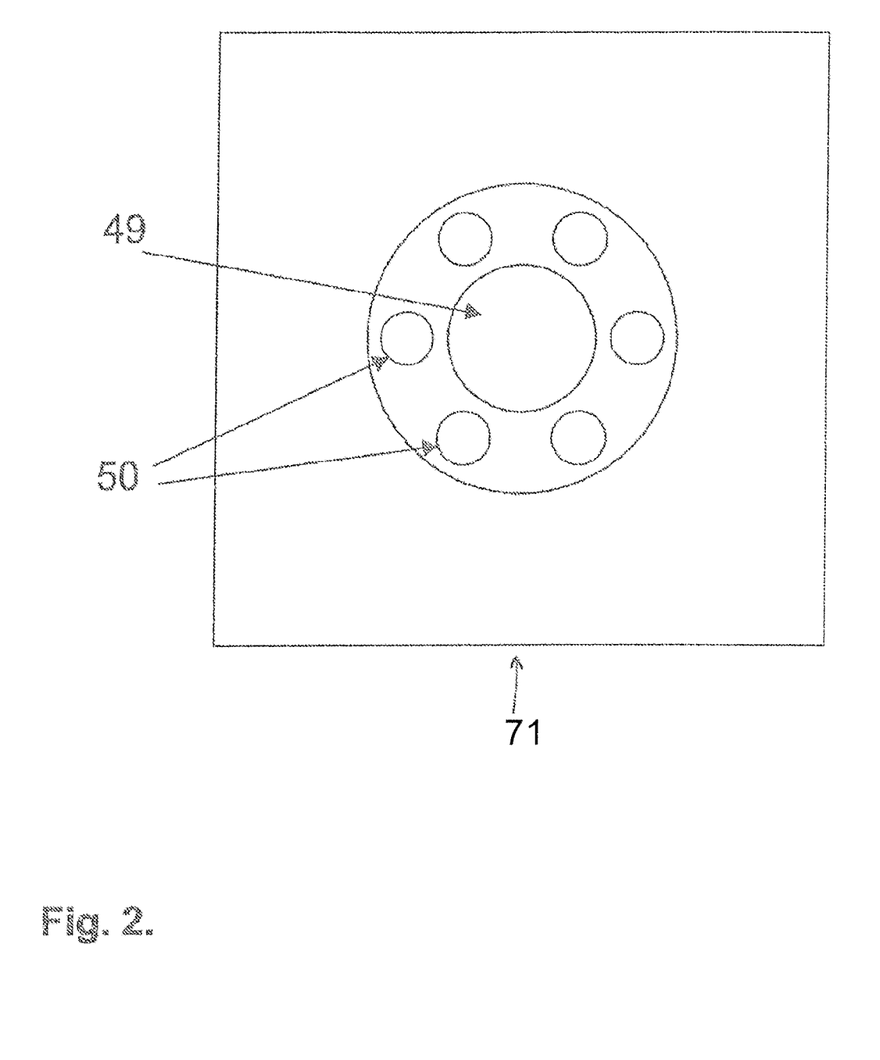
Figure 3:
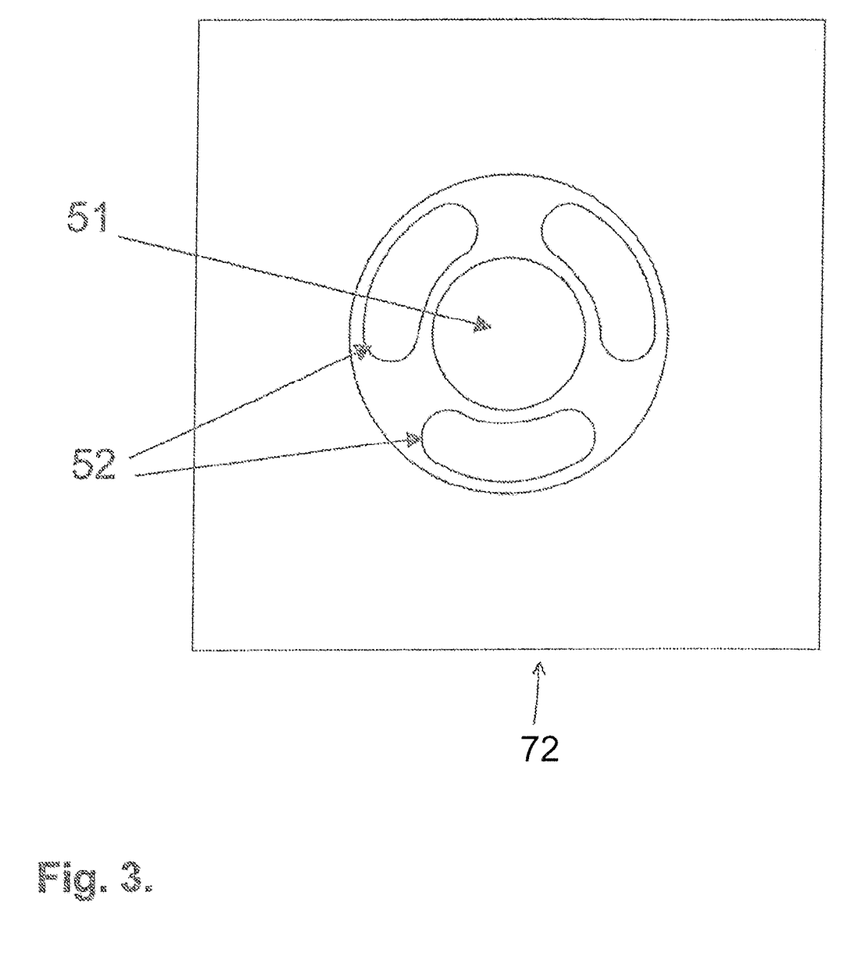

Returning FIG. 1 and to channels 4, the size and distribution of channels 4 can be optimised to avoid voids into which membrane 2 can deflect in the case where the pressure in chamber 8 is greater than the pressure in chamber 9 and the membrane is forced towards the bottom housing 7. In this case, the membrane 2 cannot be deflected into the channels 4. The size and distribution of the channels 4 can also be optimised to provide sufficient fluid flow into chamber 9. The design of channels 4 allows for these two competing requirements to be balanced. FIG. 2 shows an arrangement of channels 50 distributed radially around the base of the valve seat 49. The channels 50 are located in the bottom housing 71. The diameter of the channels 50 can be reduced to maximise the support offered to the membrane 2 in FIG. 2, but their number increased to maintain the rate of flow of fluid into the micro valve. An arrangement can be adopted that balances these two competing requirements. FIG. 3 shows an alternative arrangement of channels 52 to provide a fluid conduit into the micro valve 100. The channels 52 are distributed radially around the base of the valve seat 51. The channels 52 are located in the bottom housing 72. It will be clear to those practiced in the art that other arrangements for the channels 52 are possible.

Figure 4:
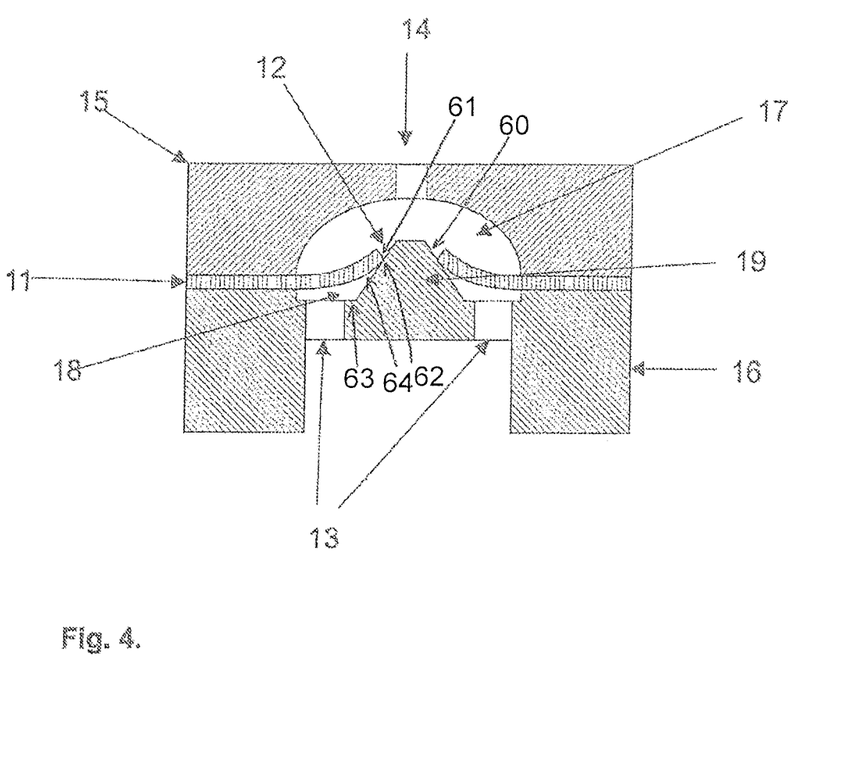

Referring to FIG. 4 shows another embodiment of the micro valve as described in the present invention. FIG. 4 shows a valve seat 19 where the tip of the cone has been removed. This embodiment can provide an advantage in manufacturing where very small sharp features are often difficult to manufacture with high precision, repeatability, in high numbers and cost effectively. All other aspects of the device shown in FIG. 4 are as described for the device in FIG. 1. The alternative arrangement of the channels 13 are also as described in FIG. 2 and FIG. 3.

In FIG. 4, the membrane is indicated with reference number 11. The hole in the membrane has reference number 12. The channels in the bottom housing (first body portion) have reference number 13. The conduit in the top housing (second body portion) has reference number 14. The top housing has reference number 15. The bottom housing has reference number 16. The chamber between the top housing and membrane has reference number 17. The chamber between the bottom housing and membrane has reference number 18. The conical valve seat has reference number 19. The surface of the conical valve seat has reference number 60. The inner periphery of the hole has reference number 61. The edge of the inner periphery has reference number 62. The mechanical stop has reference number 63. The surface of the membrane has reference number 64.

Figure 5:
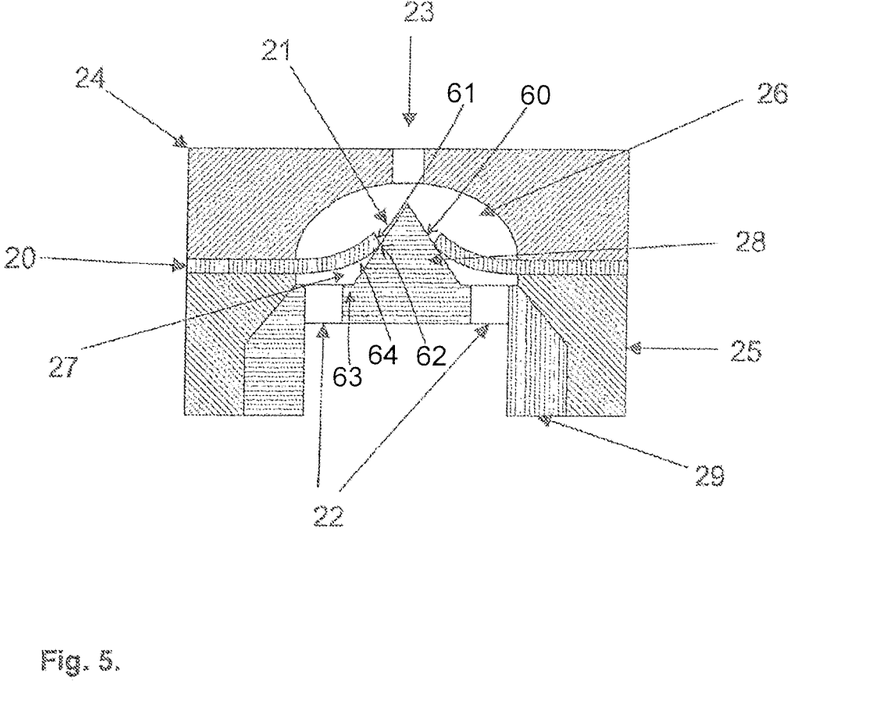

Referring to FIG. 5, another embodiment of the micro valve described in the present invention is shown. The micro valve comprises a top housing 24, a bottom housing 25 and a membrane 20 sandwiched between them. The bottom housing 25 is further adapted to accept and insert 29.

The top housing 24 comprises a chamber 26 formed to accommodate the valve seat 28 when the micro valve is assembled. The top housing 24 further comprises a channel 23 formed to provide fluid connection to the chamber 26.

The membrane 20 is formed from elastomeric material and a hole 21 is formed through it.

The insert 29 is formed to fit into a recess in the bottom housing 25, or to interface mechanically with the bottom housing 25 such that the insert 29 is accurately located relative to the hole 3 in the membrane 20. Those practiced in the art will appreciate the different arrangement that can be used to achieve this. The insert 29 comprises a conical valve seat 28. The valve seat protrudes through the hole 21 in the membrane 20. Locating the valve seat 28 into the hole 3 in membrane 20 creates a chamber 27 between the membrane 20 and the insert 29 and bottom housing 25. Channels 22 are formed in the insert 29 to provide fluid flow into chamber 27.

In FIG. 5, the surface of the conical valve seat is indicated by reference number 60. The inner periphery of the hole has reference number 61. The edge of the inner periphery has reference number 62. The mechanical stop has reference number 63. The surface of the membrane has reference number 64.

Operation of the micro valve is similar to that described when describing the device in FIG. 1. The parameters that define the breakthrough pressure of the micro valve are also similar to those described for the micro valve shown in FIG. 1. The channels 22 can also be designed according to the alternative designs shown in FIG. 2 and FIG. 3.

Figure 6:
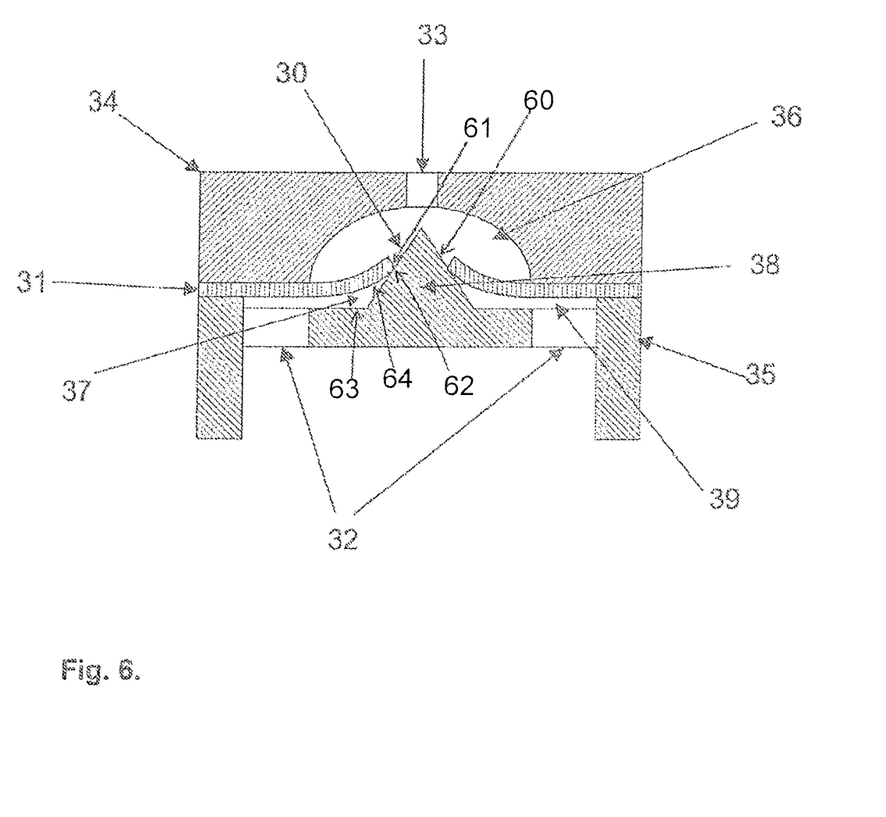

FIG. 6 shows another embodiment of the micro valve as described in the present invention. The micro valve described in FIG. 6 is different from the micro valve described in FIG. 1 with respect to the location of the channels 32 that provide fluid connection to the chamber 37 formed between the membrane 31 and the bottom housing 35. The channels 32 are located in a part of the micro valve that does not provide mechanical support for the membrane 31 to prevent it deflecting when the pressure in chamber 36 is higher than the pressure in chamber 37. This allows the design of the micro valve to be optimised to provide the best mechanical stop 63 for the membrane 31. The micro valve in FIG. 6 also allows the design of chamber 37 to be optimised for fluid flow in chamber 31.

In FIG. 6, the hole in the membrane is indicated by reference number 30. The conduit in the top housing has reference number 33. The top housing has reference number 34. The conical valve seat has reference number 38. The surface of the conical valve seat has reference number 60. The inner periphery of the hole has reference number 61. The edge of the inner periphery has reference number 62. The mechanical stop has reference number 63. The surface of the membrane has reference number 64.

Figure 7:
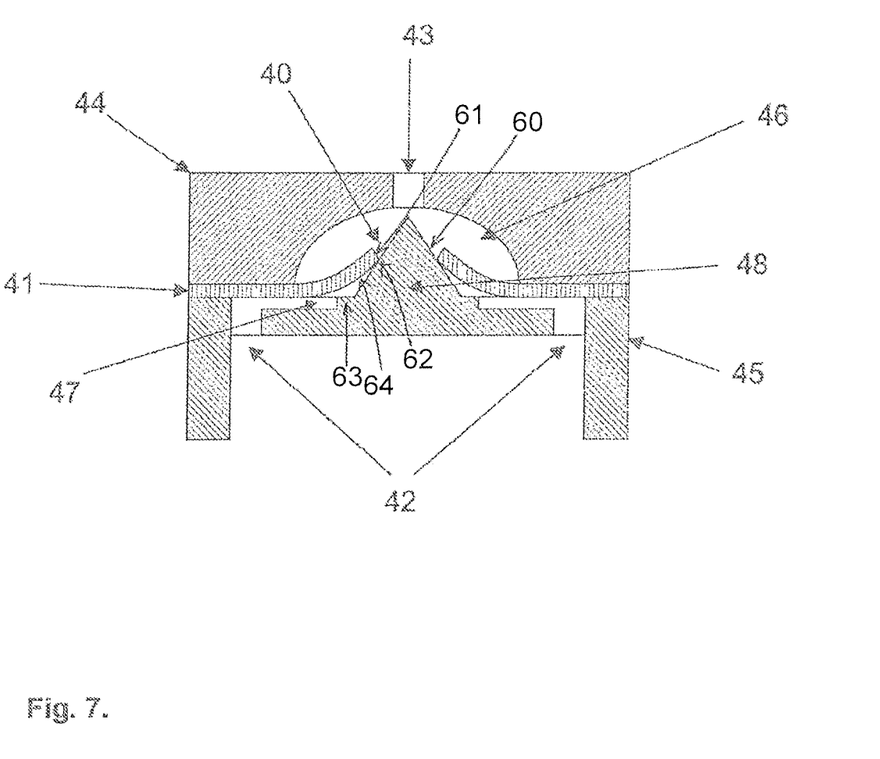
FIG. 7. shows a cross section through an alternative embodiment of the micro valve as described in the present invention, showing an alternative arrangement of inlet holes that form the inlet conduit for the micro valve.

FIG. 7 shows another embodiment of the micro valve described in the present invention. The micro valve described in FIG. 7 is different from the micro valve described in FIG. 1 with respect to the location of the channels 42 that provide fluid connection to the chamber 47 formed between the membrane 41 and the bottom housing 45. The micro valve shown in FIG. 7 has the advantage that the channels 42 that provide fluid connection to chamber 47 formed between the membrane 41 and the bottom housing 45 are designed to minimise the volume of chamber 47.

In FIG. 7, the hole in the membrane is indicated with reference number 40. The conduit in the top housing (second body portion) has reference number 43. The top housing has reference number 44. The chamber between the top housing and membrane has reference number 46. The conical valve seat has reference number 48. The surface of the conical valve seat has reference number 60. The inner periphery of the hole has reference number 61. The edge of the inner periphery has reference number 62. The mechanical stop has reference number 63. The surface of the membrane has reference number 64.

The following clauses are provided as a further description of the one way valve according to the invention.
1. One way valve comprising:
    a conical shaped valve seat; and
    a membrane having a hole that locates around the conical valve seat, such that the surface of the valve seat seals onto the inner periphery of the hole in the membrane, wherein, in use, the membrane is deflected from the surface of the valve seat to provide a fluid path across the membrane and to allow fluid to flow from one side of the membrane to the other.
2. A valve according to clause 1, wherein the membrane is selectively supported around the outer peripheral portion such that deflection is restricted to the inner portion.
3. A valve according to clause 2, wherein the hole in the membrane is formed in the inner portion of the membrane.
4. A valve according to any one of the preceding clauses, further comprising a first body portion that includes a valve seat.
5. A valve according to any one of the preceding clauses, further comprising a mechanical stop to restrict the deflection of the inner portion of the membrane towards the valve seat and the first body portion.
6. A valve according to clause 5, wherein the mechanical stop forms part of the valve seat.
7. A valve according to clause 5, wherein the mechanical stop forms part of the first body portion.
8. A valve according to any one of the preceding clauses, wherein the first body portion has a fluid conduit formed to provide the inlet to the valve
9. A valve according to clause 8, wherein an aperture is formed as at the base of the valve seat that forms part of the fluid path across the membrane
10. A valve according to clause 9, wherein the number and arrangement of apertures is selected according to a desired flow rate through the valve.
11. A valve according to clause 9, wherein the number and arrangement of apertures is selected to provide the mechanical support for the membrane
12. A valve according to any one of the clauses 9, 10 and 11, wherein the apertures are formed as part of the mechanical stop
13. A valve according to clause 8, wherein the fluid conduit is formed as an aperture on the outer peripheral portion of the membrane.
14. A valve according to clause 13, wherein the number and arrangement of apertures is selected according to a desired flow rate through the valve.
15. A valve according to any one of the clauses 8 to 14, further comprising a second body portion on the opposite side of the membrane to the first body portion.
16. A valve according to clause 15, wherein the second body portion has a fluid conduit formed there through defining an outlet of the valve.
17. A valve according to clause 15 or 16, wherein a cavity is defined by a recess in the second body portion into which the inner membrane portion moves when the valve opens
18. A valve according to clause 17, wherein the cavity creates a fluid path from the hole in the membrane to the outlet of the valve.
19. A valve according to any one of the preceding clauses, wherein the membrane is of a material selected from a group of materials including: rubber, silicone, and an elastomer.
20. A pump incorporating the valve according to any one of the preceding clauses.
21. A medication delivery device incorporating a pump according to clause 20.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A pump comprising a pumping chamber, an inlet valve arranged at an inlet of the pumping chamber, and an outlet valve arranged at an outlet of the pumping chamber, wherein the inlet valve and the outlet valve are each passive one-way valves comprising:
    a conical shaped valve seat having a conical surface and a base surrounding the conical surface; and
    a membrane having a hole that is located around the conical surface of the valve seat such that at least a portion of the valve seat projects through the hole, wherein an inner periphery of the hole is configured to seal against the conical surface of the valve seat when the valve is closed and the membrane is configured to deflect away from the conical surface to provide a fluid path across the membrane;
    wherein one or more apertures are formed in the base of the valve seat and form part of the fluid path across the membrane.

2. A pump according to claim 1, wherein the one-way valves each comprise an inlet side and an outlet side and the membrane is configured to deflect from the surface of the valve seat at a specific pressure difference between the inlet side and the outlet side.

3. A pump according to claim 1, wherein the membrane is selectively supported around an outer peripheral portion of the membrane such that deflection is restricted to an inner portion of the membrane.

4. A pump according to claim 3, wherein the inner portion of the membrane is deflected upwardly around the conical valve seat.

5. A pump according to claim 1, wherein the one-way valves each further comprise a first body portion having the valve seat, and a second body portion on an opposite side of the membrane to the first body portion.

6. A pump according to claim 5, wherein an outer peripheral portion of the membrane is held between the first body portion and the second body portion such that deflection of the membrane is restricted to only an inner portion of the membrane.

7. A pump according to claim 5, wherein the second body portion has a chamber located over the valve seat and which accommodates the membrane when the membrane is deflected away from the conical surface.

8. A pump according to claim 1, wherein the membrane comprises an elastomer which applies a force on the valve seat when the valve is closed.

9. A pump according to claim 1, further comprising a mechanical stop to restrict the deflection of the membrane towards the valve seat.

10. A pump according to claim 1, wherein the pump is a micro pump and the passive one-way valves are micro valves.

11. A pump according to claim 1, wherein the pump is a liquid pump for pumping liquid.

12. A pump according to claim 11, wherein the liquid pump is a pulsatile pump further comprising a piston arranged to move in reciprocating motion in the pumping chamber.

13. A pump according to claim 12, wherein the piston is arranged to enter the pumping chamber and a volume swept by the piston entering the pumping chamber is substantially equivalent to a displaced volume of liquid which exits the pumping chamber via the outlet.

14. A pump according to claim 13, wherein the displaced volume of liquid varies by no more than +/−2.5 nano-litres between a plurality of cycles of the piston entering the pumping chamber.

15. A pump according to claim 12, wherein the piston is arranged to retract from the pumping chamber and a volume swept by the piston retracting from the pumping chamber is substantially equivalent to a volume of liquid which enters the pumping chamber via the inlet from a reservoir.

16. A pump according to claim 15, wherein the reservoir is held at substantially ambient atmospheric pressure.

17. A pump according to claim 13, wherein the piston substantially displaces all of a volume enclosed by the pumping chamber when the piston enters the pumping chamber.

18. A pump according to claim 1, wherein the pumping chamber has substantially rigid walls.

19. A medication delivery device incorporating the pump according to claim 1.

20. A medication delivery device comprising:
a pump, the pump comprising:
  a pumping chamber;
  an inlet valve arranged at an inlet of the pumping chamber; and
  an outlet valve arranged at an outlet of the pumping chamber;
  wherein the inlet valve and the outlet valve are each passive one-way valves comprising:
    a conical shaped valve seat; and
    a membrane having a hole that is located around a conical surface of the valve seat such that at least a portion of the valve seat projects through the hole, wherein an inner periphery of the hole is configured to seal against the conical surface of the valve seat when the valve is closed and the membrane is configured to deflect away from the conical surface to provide a fluid path across the membrane.

21. The medication delivery device according to claim 20, wherein the pump is a micro pump, and the inlet valve and the outlet valve are each passive one-way micro valves.

22. A micro pump comprising:
a pumping chamber;
an inlet valve arranged at an inlet of the pumping chamber; and
an outlet valve arranged at an outlet of the pumping chamber;
wherein the inlet valve and the outlet valve are each passive one-way micro valves comprising:
  a conical shaped valve seat; and
  a membrane having a hole that is located around a conical surface of the valve seat such that at least a portion of the valve seat projects through the hole, wherein an inner periphery of the hole is configured to seal against the conical surface of the valve seat when the valve is closed and the membrane is configured to deflect away from the conical surface to provide a fluid path across the membrane.

23. A micro pump for a medication delivery device, the micro pump comprising:
a one-way micro valve, the one-way micro valve comprising:
  a conical shaped valve seat; and
  a membrane having a hole that is located around the conical valve seat, such that a surface of the valve seat seals onto an inner periphery of the hole in the membrane, wherein, in use, the membrane is deflected from the surface of the valve seat to provide a fluid path across the membrane and allowing fluid to flow from one side of the membrane to the other, wherein the conical valve seat protrudes through the hole and the surface of the valve seat seals onto an edge of the inner periphery of the hole in the membrane.

24. The micro pump according to claim 23, wherein the micro pump comprises a pumping chamber and the micro valve membrane has flexibility, and when the micro valve is closed the amount of flexibility of the membrane corresponds to a micro valve volume that is connected to the pumping chamber, wherein the micro valve volume does not expand by more than 2.0 nano-litres or contract by more than 2.5 nano-litres.

25. A medication delivery device comprising the micro pump according to claim 23.

26. The medication delivery device according to claim 25, wherein the one-way micro valve further comprises:
a first body portion that includes the valve seat, the first body portion having a fluid conduit to provide an inlet of the one-way micro valve;
an aperture formed at a base of the valve seat that forms part of the fluid path across the membrane; and
a second body portion on an opposite side of the membrane to the first body portion, wherein a cavity is defined by a recess in the second body portion into which the membrane moves when the valve opens; and
wherein the second body portion overlaps the membrane in the region of the aperture so as to restrict deflection of the membrane into the recess in the region of the aperture.

* * * * *